United States Patent
Dittrich et al.

(10) Patent No.: US 7,412,494 B2
(45) Date of Patent: Aug. 12, 2008

(54) MERGING PARTIAL QUERY RESULTS INTO A SINGLE RESULT

(75) Inventors: Jens-Peter Dittrich, Heidelberg (DE);
Olaf Meincke, Heidelberg (DE);
Guenter Radestock, Karlsruhe (DE);
Andrew Ross, Altrip (DE)

(73) Assignee: SAP AG, Walldorf (DE)

( * ) Notice: Subject to any disclaimer, the term of this patent is extended or adjusted under 35 U.S.C. 154(b) by 1015 days.

(21) Appl. No.: 10/789,812

(22) Filed: Feb. 27, 2004

(65) Prior Publication Data

US 2005/0193088 A1      Sep. 1, 2005

(51) Int. Cl.
*G06F 15/16* (2006.01)
(52) U.S. Cl. .............................. 709/217; 707/3; 707/10
(58) Field of Classification Search ...... 707/3, 707/10, 104.1; 709/217; 704/3
See application file for complete search history.

(56) References Cited

U.S. PATENT DOCUMENTS

| | | | | |
|---|---|---|---|---|
| 5,822,720 | A * | 10/1998 | Bookman et al. | 704/3 |
| 6,163,782 | A * | 12/2000 | Singhal | 707/104.1 |
| 6,728,704 | B2 * | 4/2004 | Mao et al. | 707/3 |
| 6,879,982 | B2 * | 4/2005 | Shirasaka | 707/10 |
| 6,895,430 | B1 * | 5/2005 | Schneider | 709/217 |
| 2002/0198869 | A1 * | 12/2002 | Barnett | 707/3 |

OTHER PUBLICATIONS

Yang, et al., "A re-examination of text categorization methods", *Proceedings of ACM SIGIR Conference on Research and Development in Information Retrieval*, SIGIR, 1999, pp. 42-49.

Joachims, "Text Categorization with Support Vector Machines: Learning with Many Relevant Features", Machine Learning: ECML-98, Proceedings of the 10th European Conference on Machine Learning, Apr. 1998, Chemnitz, Germany, pp. 137-142.

Salton, et al., "A Vector Space Model for Automatic Indexing", *Journal of the American Society for Information Science*, vol. 18, No. 11, Nov. 1975, pp. 613-620.

Written, et al., *Managing Gigabytes, Compressing and Indexing Documents and Images*, Second Edition, Morgan Kaufmann Publishers, San Francisco, California, USA, 1999.

Joachims, Learning to Classify Text Using Support Vector Machines. Dissertation, Cornell University, Department of Computer Science, Kluwer Academic Publishers, May, 2002.

Vivisimo® Clustering Engine, *Content Integrator*, http://www.vivisimo.com 2004.

Vivisimo® Clustering Engine, *Clustering Engine*, http://www.vivisimo.com 2004.

\* cited by examiner

*Primary Examiner*—Jungwon Chang
(74) *Attorney, Agent, or Firm*—Mintz, Levin, Cohn, Ferris, Glovsky & Popeo, P.C.

(57) ABSTRACT

A method and system for executing an information retrieval query in a multiserver computing environment is disclosed. The method and system employ a technique in which the query is distributed among each of a plurality of partial index servers in the multiserver environment, and a subset of results is calculated for each of the plurality of partial index servers. Then, the subset of results are merged in one logical index server to generate a merged result.

5 Claims, 6 Drawing Sheets

MERGING PARTIAL QUERY RESULTS INTO A SINGLE RESULT

BACKGROUND

The following description relates to information retrieval in a multiserver computing environment.

A database management system can include a computer system that includes one or more servers having access to one or more databases. A database is a collection of tables storing information about classes of physical or conceptual objects, and information about a particular object can be stored in a record that is represented as a row in a table. A collection of tables can be stored within one computer system or spread out among a network of multiple computer systems in a distributed landscape.

In a network of multiple distributed computer systems, users may enter queries that require a collection of results from multiple databases. In such cases, partial query results from different servers may have to be sent over the network and merged into a single result set by a dedicated server that merges the results. An example of a class of user query that requires the collection of data from multiple systems in a distributed landscape is that of collecting aggregate information satisfying some logical condition specified in the user query.

As a more specific example, a user may request a list of top-performing salespersons of a company within a geographical area in a particular year, to be sorted by the aggregated dollar value of sales, where the information to be aggregated is scattered across the geographical area in multiple databases of individual company sales outlets. In typical cases of this sort, when the query results are displayed, for example on a graphical user interface, only a subset of the total results are displayed at a time. However, in many cases, the complete result set is not needed, and the N displayed results are sufficient for the user. In such cases, if all servers send a complete set of their partial results, most of the collected data is thrown away.

SUMMARY

One method to improve the efficiency of information retrieval in a distributed or multiserver computing environment includes a technique in which only the data that is needed to build a required range of results is sent in response to a query. Since less data is sent over the network, and consequently less data is merged into the required result set, query execution is accelerated.

In a method of executing an information retrieval query in a multiserver computing environment, the query is distributed among each of a plurality of partial index servers in the multiserver environment, and a subset of results is calculated for each of the plurality of partial index servers. Then, the subset of results are merged in one logical index server to generate a merged result.

In an alternative process, a method further includes the steps of requesting N sorted results with an offset M from each of the plurality of partial index servers, and merging C results from each of the plurality of partial index servers in one logical index server, wherein C is much greater than N and represents an upper bound on the number of results that needs to be considered in order to obtain the N results required.

The details of one or more embodiments are set forth in the accompanying drawings and the description below. Other features, objects, and advantages will be apparent from the description and drawings, and from the claims.

BRIEF DESCRIPTION OF THE DRAWINGS

These and other aspects will now be described in detail with reference to the following drawings.

Like reference symbols in the various drawings indicate like elements.

DETAILED DESCRIPTION

The systems and techniques described here relate to information queries and information retrievals in a multiserver computing environment.

Figure 1:
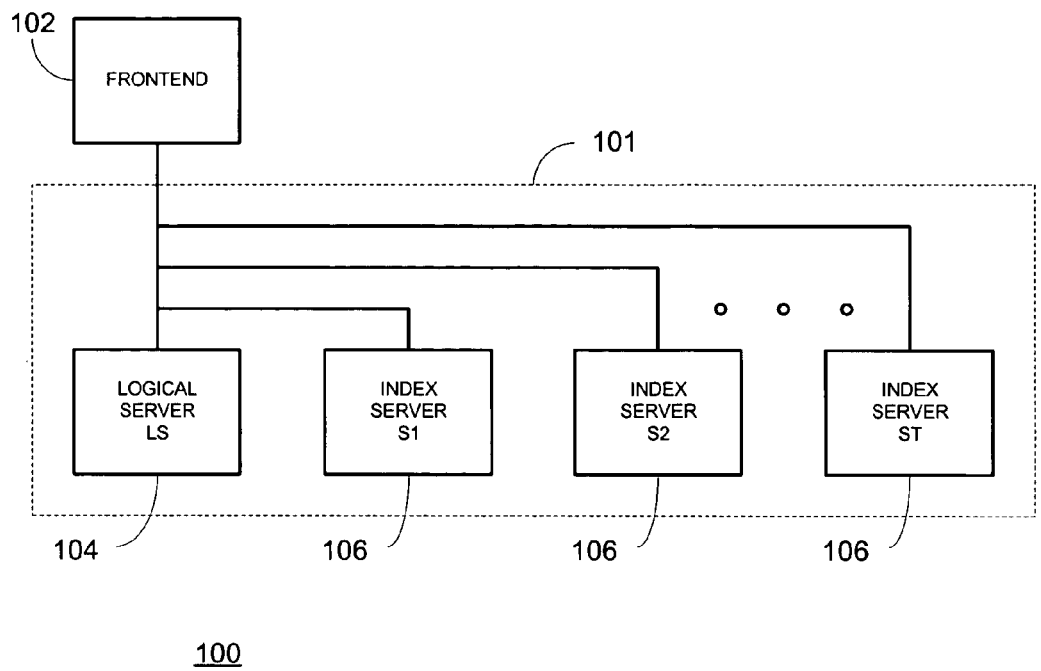
FIG. 1 is a block diagram of some of the servers in a computer system.

FIG. 1 shows a computer system 100, which may be implemented either in a single hardware installation, such as a blade server rack, or as a distributed landscape that is configured, e.g., as a local area network (LAN) or as a wide area network (WAN). The system 100 includes a set of servers 101 connected to a frontend 102. The set of servers 101 includes a "logical" index server 104 and a number of T "partial" index servers 106, numbered S1 to ST, where the logical and partial index servers are adapted to function together as a single large index server. The set of servers 101 in FIG. 1 is illustrated as having three or more partial index servers 106, although any number T of index servers may be used. The frontend 102 may include a user interface that runs a browser application and displays a web page, such as a portal page. The frontend 102 may also be any type of user interface for receiving user queries and for displaying query results. The frontend 102 may be included in a computer system configured to execute a query, alone or in combination with the logical server 104 and/or partial servers 106, in accordance with methods disclosed herein.

In cases where a response to a user query returns many results that are to be aggregated together in a manner specified by the query (for example, by being summed or averaged to form an aggregate quantity for each item in the result set) over the network, a particular method may be employed to provide a result set. The method can be applied to at least two types of query cases:

(1) The user requests N unsorted results with offset M (where N and M are natural numbers whose sum is much less than the total number of records from which the results are selected). For example, the user may request, from an unsorted list of employees who made sales in a particular geographical area in a particular year, a display of the employee names that appear on the list in positions 21 through 30. An aggregate quantity corresponding to the total sales volume achieved by each of those employees may be displayed alongside the employee name.

(2) The user requests N sorted results with offset M (where the sorting is in accordance with the aggregate whose respective values are displayed in the results list). For example, the user may request, from a list of employees who made sales in a particular geographical area in a particular year, and sorted in descending order of sales volumes achieved, a display of the employee names that appear on the list in positions 11 through 20 and which names are among the lower ten among the top twenty sales achievers. Again, an aggregate quantity corresponding to the total sales volume achieved by each employee may be displayed alongside the employee name.

Figure 2:
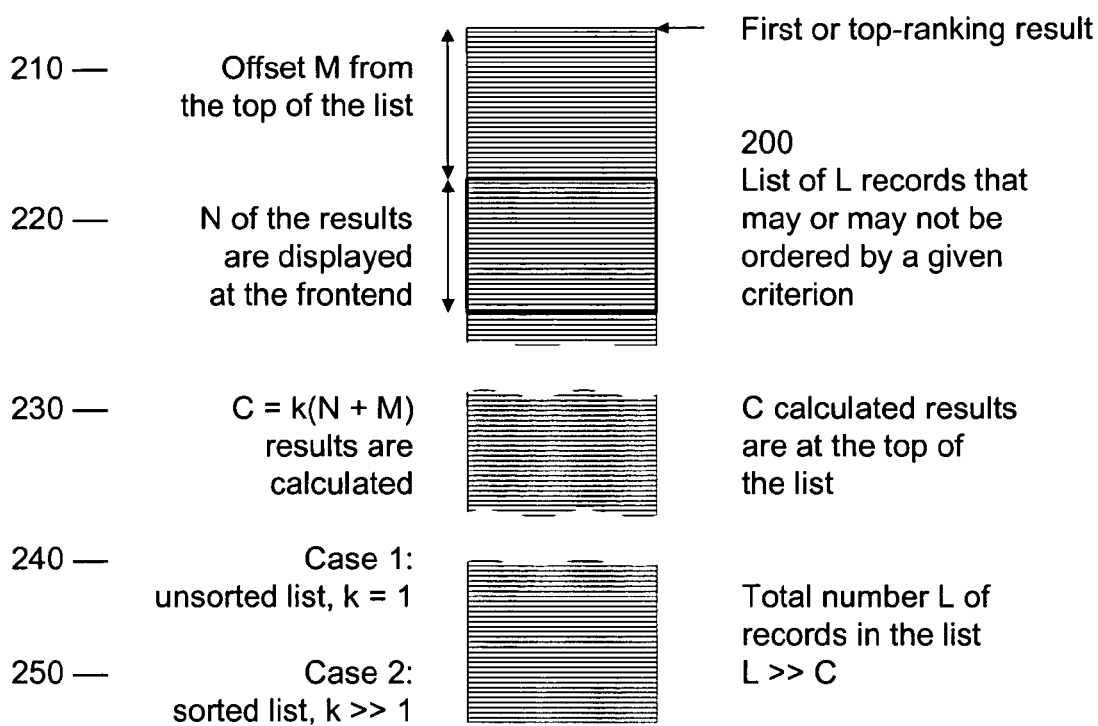
FIG. 2 illustrates a result list where N results with an offset M are selected for display at the frontend.

FIG. 2 graphically illustrates a stored list 200 of L records that is the source of a set of selected results in both the case of an unsorted result list (case (1) above, 240) and the case of a sorted result list (case (2) above, 250). In either case, the set of servers 101 including T partial index servers 106 (S1, ..., ST) and one logical index server 104 (LS) is configured to merge the calculated results (230) and forward N results (220), offset by M results (210), to the frontend 102. Each query case will now be described in turn.

Case (1): N Unsorted Results With Offset M

Figure 3:
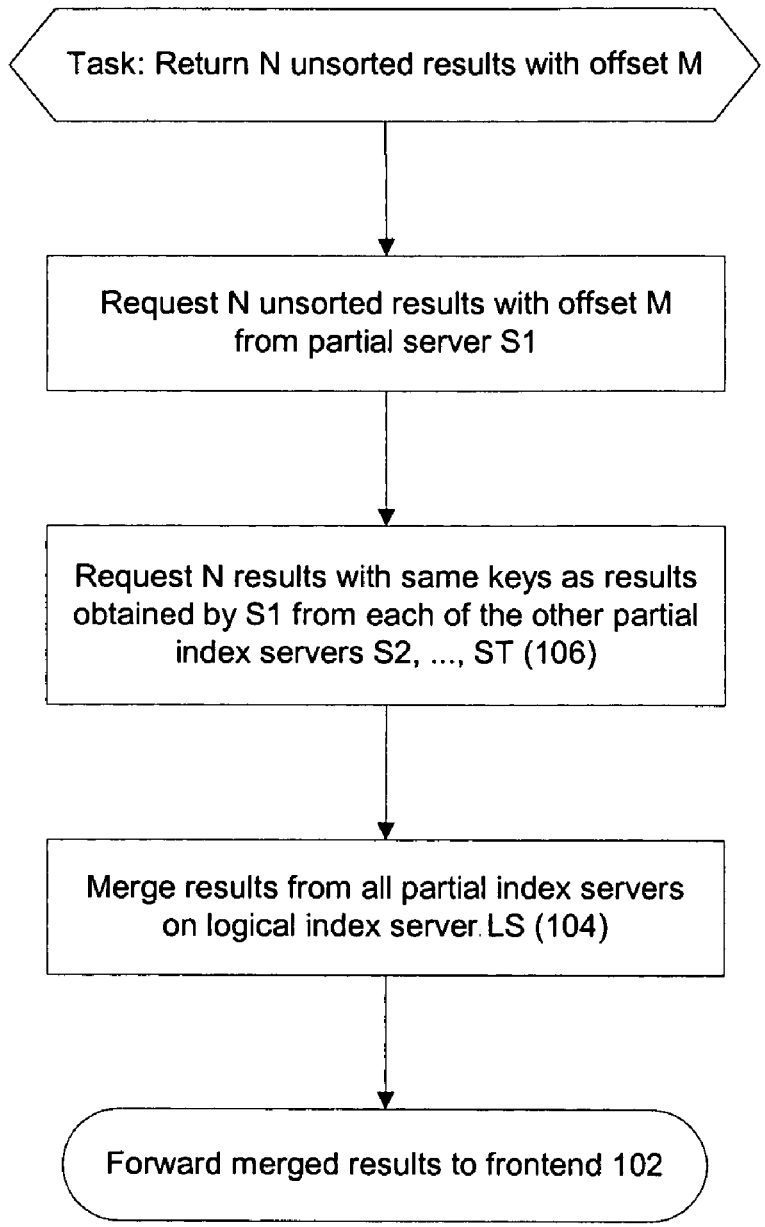
FIG. 3 is a flowchart of a method of executing a query in a multiserver computing environment.
Figure 4:
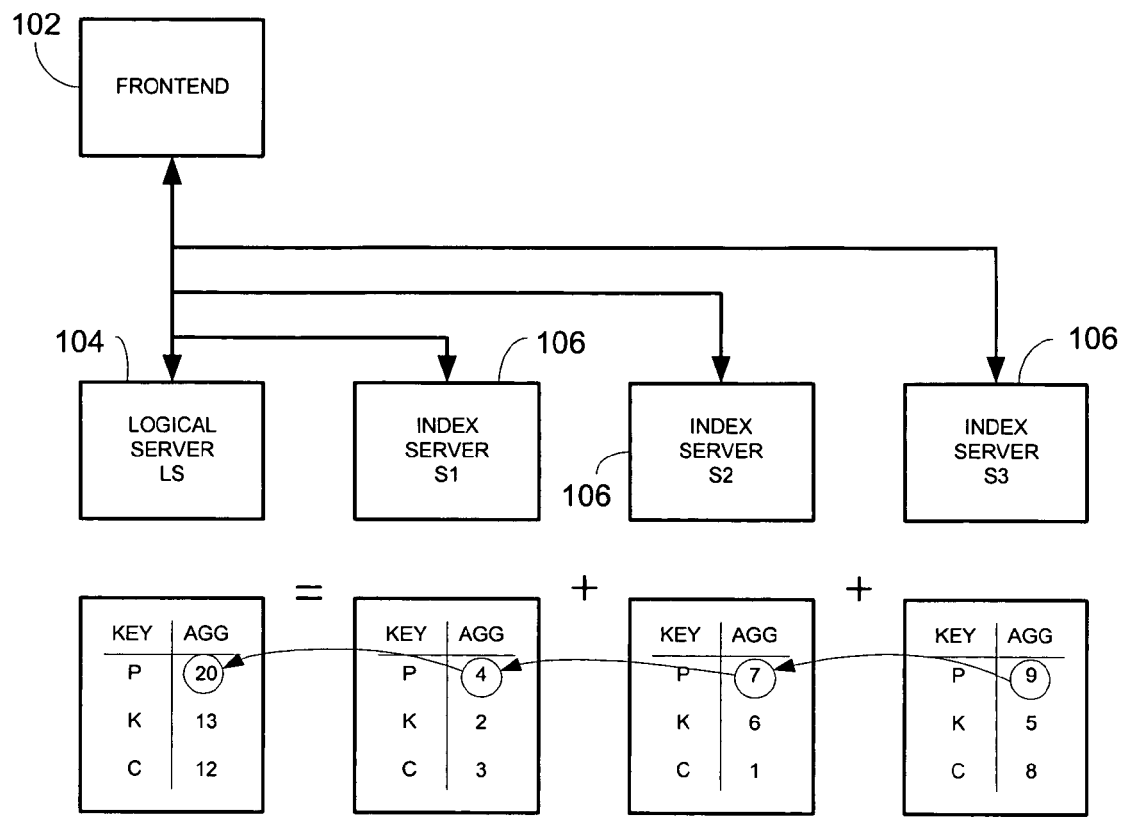
FIG. 4 is a graphical block diagram of an example of the method illustrated in FIG. 3.

FIG. 3 is a flowchart of a method 300 for executing a query in a multiserver computing environment. At 302 a request is sent to one partial index server for N unsorted results with offset M, and with keys K1, ..., KN. At 304, a request is sent to each of the other partial index servers S2, ... ST for N results with the same keys K1, ..., KN as the results sent by partial index server S1. Since aggregate quantities requested in the query are calculated only for the relatively small subset C of the total number L of records, the response to the request may occur quickly. At 306, the results from all servers S1, ..., ST are merged on logical server LS, and at 308 the merged results are forwarded to the frontend. An example of the method 300 is illustrated graphically in FIG. 4 using one logical server 104 and three partial index servers 106. In a more specific example, let key P denote a specific employee in a geographical area, and let the records specified by key P in the data indexed by the respective index servers S1, S2, and S3 indicate the sales volume achieved by that employee in three different cities of the geographical area, here schematically indicated in FIG. 4 by the respective numbers 4, 7, and 9. The aggregated sales volume achieved by the employee denoted by key P is the sum of 4, 7, and 9, which equals 20, as shown in FIG. 4.

In accordance with the method 300, a maximum of T*N aggregates plus N keys are sent over the network. Any aggregates that have a value of 0 are not sent, to minimize network data traffic overhead. Further, the merging process is fast since only N aggregates are merged at the logical server 104. Further still, for a given choice of server S1, cursor stability is ensured; that is, because the keys K1, KN selected are the same, the user at the frontend 102 sees the same results every time when scrolling beyond the offset.

Case (2): N sorted results with offset M

For the second case listed above, it may be assumed that in a method of executing a query on a distributed database landscape, the evaluated query results are sorted in descending order by key figure, with the highest value first. However, the method works similarly if the results are sorted in ascending order. Each partial index server can be configured to evaluate C aggregates, where C is sufficiently greater than the sum (N+M) of the number N of results to be displayed and the offset M but is much less than the total number L of records, and may be selected such that C=k(N+M) for a suitable value of k (such as 100, for example).

Merged aggregate values have a value so far that is calculated on the basis of the C records evaluated, and an upper bound that is calculated as the estimated total if all the L records were evaluated. Accordingly, for each aggregate, a delta is defined such that:

Total aggregate value=Value so far+Upper bound delta

Figure 5:
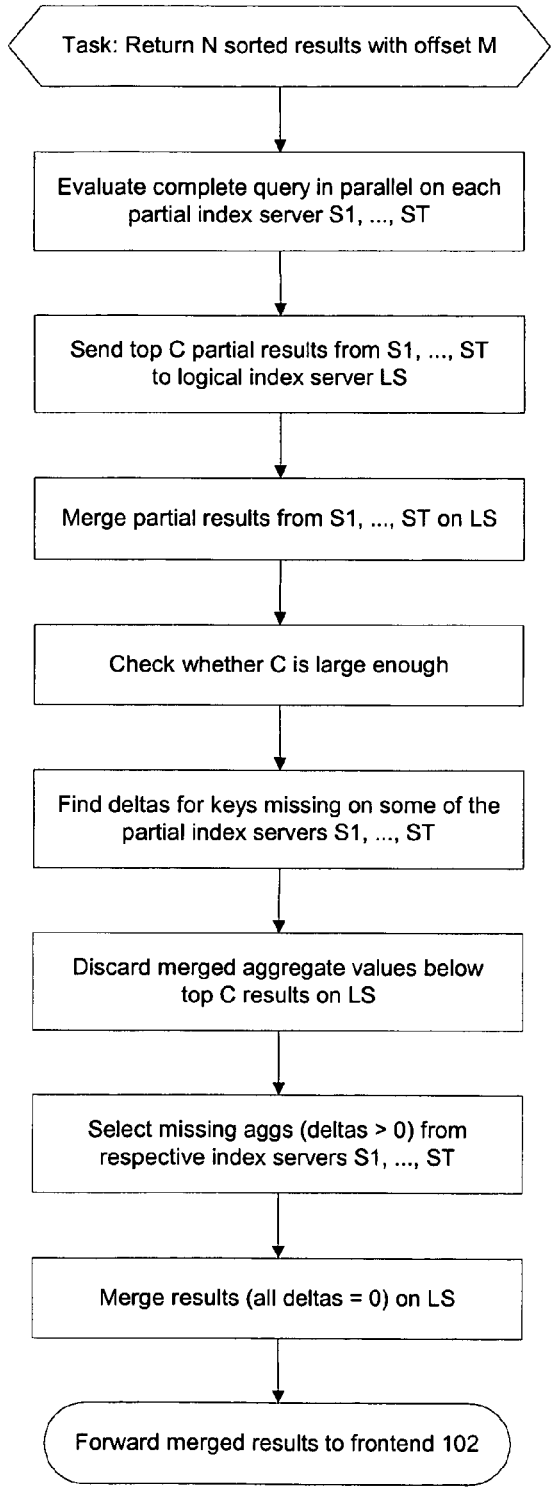
FIG. 5 is a flowchart of an alternative method of executing a query in a multiserver computing environment.

FIG. 5 is a flowchart of a method 500 of executing a query in a multiserver computing environment for N sorted results with offset M. An example in accordance with method 500 is illustrated graphically in FIG. 6. At 502 the aggregate query is evaluated on each partial index server S1, ..., ST. At 504, a number of partial results from each partial index server S1, ..., ST are sent to the logical server LS. At 506, all the sets of C partial results from the respective index servers S1, ..., ST are merged. Thus, the total number of results may be at most T*C, but can be less given that the respective sets of keys $\{K_{ij} | 1 \leq j \leq C\}$ for servers Si ($1 \leq i \leq T$) are unlikely to be disjoint and may likely overlap substantially.

Figure 6:
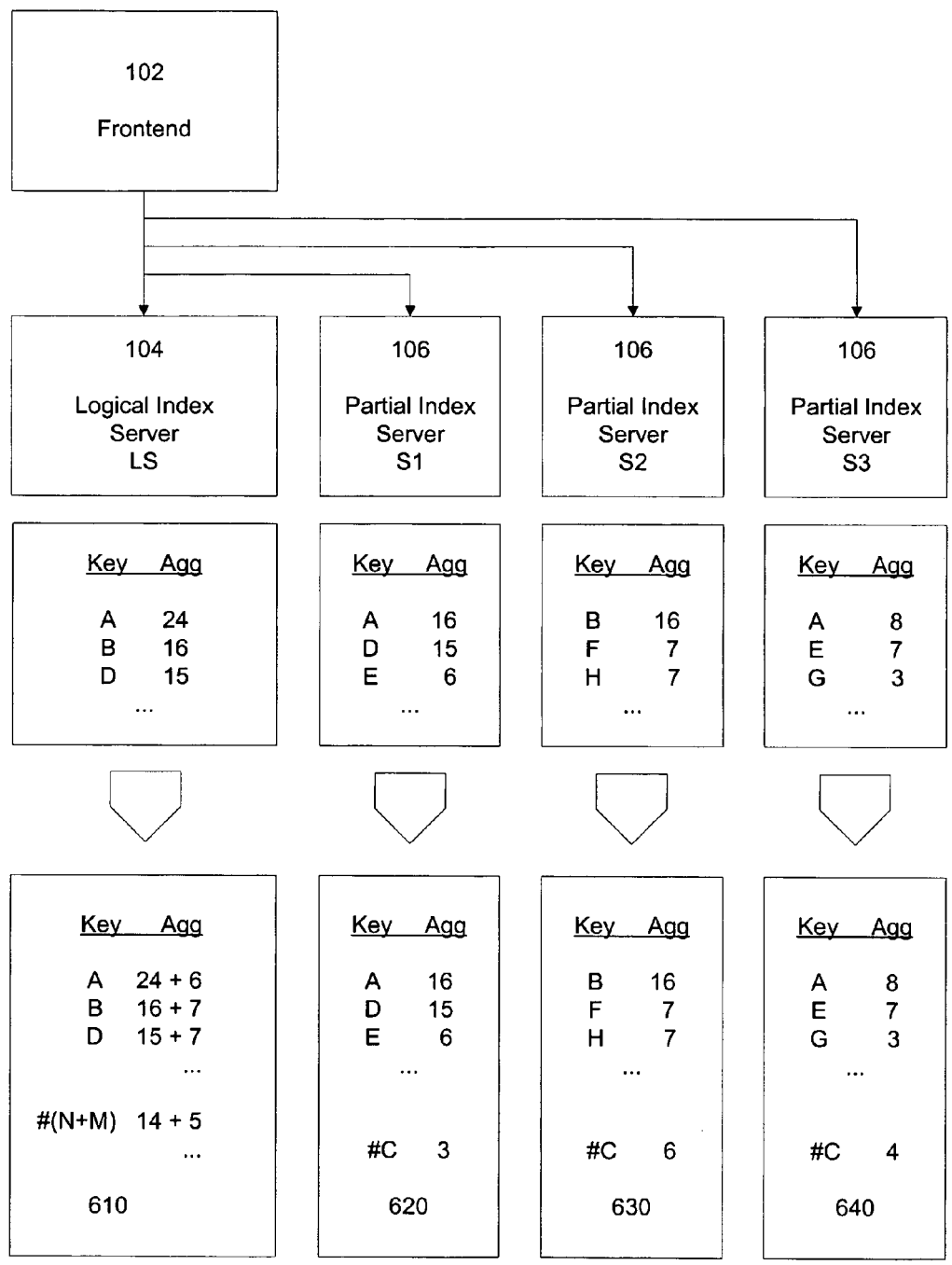
FIG. 6 is a graphical block diagram of an example of the method illustrated in FIG. 5

At 508, a check is made whether the value of C is large enough. In one implementation of the method, a sum G of the Cth aggregate values for all servers S1, ..., ST is determined. Next, a value H is calculated, where H is the (N+M)th merged aggregate value on the logical server LS. If G<H, then the value of C is sufficiently large. If G>H, then C may be reset to twice its former value (or alternatively to any other function of its former value that may be advantageous), and steps 502-506 may be repeated using the new value of C. The method 500 from 502 through 508 is depicted in FIG. 6 in the top row of boxes representing the keys and resultant aggregates. For instance, Key A corresponds to a nonzero aggregate value on index servers S1 and S3, and the total of those values is 24, which is the merged aggregate value for key A on the logical server LS. Key B has a nonzero aggregate value only on S2, and that value is 16, so the merged aggregate value on LS is 16. Similarly key D has a nonzero value of 15 on S1 and so the merged value on LS is 15.

If an index server Si does not send a result for a certain key Kij, then key Kij did not appear in the top C results for Si, which can occur either because the aggregate value for that key within the data indexed by Si was too small or because that key is not represented at all on server Si. In the case that server Si does not send a result for key Kij, the smallest aggregate in the partial result for Si (this is the aggregate at position #C, shown as "#C" in the boxes 620, 630, 640 in FIG. 6) can be taken as an upper bound delta for the missing value for Kij, at 510. The upper bound delta of each aggregate may be recorded separately from the aggregate. These upper bound delta values are shown as the numbers following the plus signs in box 610 in FIG. 6. Accordingly, aggregate A does not appear in the top C results on server S2, and the aggregate value at position #C on server S2 is 6, so 6 is the greatest additional value that key A may have obtained from S2 if the calculation of results on S2 had continued beyond position #C. Thus the upper bound delta for A is 6, which appears to the right of the plus sign beside key A on the logical index server LS. Key B fails to appear in the top C results on servers S1 and S3, where the respective aggregate values at position #C are 3 and 4, so the upper bound delta for B on the LS is 7, as shown. Key D fails to appear in the top C results on servers S2 and S3, so the upper bound delta for D on the LS is 10, as shown.

In the merged and sorted results on the logical index server LS shown in box 610, if an aggregate with key X plus its upper bound delta is less than the value of the aggregate at position #(N+M) without its upper bound delta, which in the case shown is equal to 14, then key X will not appear in the final result set, since even in the most favorable case for X that it accrues the maximum additional value possible from the so-far-unknown contributions estimated in its upper bound delta and the aggregate at position #(N+M) accrues no additional value from the contributions estimated in its delta, key X will be pushed below the aggregate at position #(N+M) in the ranking. Accordingly, key X can be discarded at step 512. That is, in box 610 in FIG. 6, any of the keys X below position #(N+M) in the merged results list may be discarded if its value inclusive of its upper bound delta is less than 14. Thus the set of keys for which exact delta values must be retrieved from the partial index servers is reduced. Note that the earlier check at step 508 on the value of C ensures that the fixed part of the value of the aggregate at position #(N+M), which part is shown equal to 14, is greater than the sum of the values at position #C on the servers 106 (which sum is shown equal to 13).

At step 514, for each server Si that did not send certain keys Kij, the remaining aggregate values for these keys are selected. These remaining aggregate values may be found on these servers below position #C in the ordering scheme. At step 516, any additional results found on those servers for the remaining aggregates are merged with the previously merged results. Once this is done, there is no remaining uncertainty in the top (N+M) merged results and all the upper bound deltas may be reset to 0. The calculation is now complete and N results with offset M may be forwarded to the frontend.

If the subsequent selections at 514 are not required, then only T*C aggregates are sent over the network. While re-selecting aggregates at 514 can be expensive (since aggregation is stateless such that a result so far cannot be reused), only the required aggregates are calculated, so that the expense is less than repeating the entire query.

Although a few embodiments have been described in detail above, other modifications are possible. For example, any rearrangement of the logic flows depicted in FIGS. 3 and 5 would be within the scope of the invention described herein. Other embodiments may be within the scope of the following claims.

The invention claimed is:

1. A method of executing an information retrieval query in a multiserver computing environment, the method comprising:
    requesting N unsorted results with an offset M from a first of a plurality of partial index servers in the multiserver computing environment,
    receiving the N unsorted results, the N unsorted results having keys K1, . . . , KN;
    requesting M unsorted results from each other of the plurality of partial index servers, the request for the M unsorted results defining that each of the N unsorted results has the same keys Kj of the respective N unsorted results requested from the first of the plurality of partial index servers, and wherein ($1 \leq j \leq N$);
    calculating a subset of results for each of the plurality of partial index servers; and
    merging the subset of results in one logical index server to generate a merged result.

2. A method in accordance with claim 1, further comprising receiving the query from a frontend computer system.

3. A method in accordance with claim 2, further comprising sending the merged result to the frontend computer system.

4. A method of executing an information retrieval query in a multiserver computing environment, the method comprising:
    distributing the query among each of a plurality of partial index servers in the multiserver environment by:
    requesting N sorted results with an offset M from each of the plurality of partial index servers;
    merging C results from each of the plurality of partial index servers in one logical index server, wherein C is much greater than N and represents an upper bound on the number of results that needs to be considered in order to obtain the N results required, the value C being determined by:
        first determining a sum G of the Cth aggregate values for the plurality of partial index servers; and
        second determining a value H representing the (N+M)th aggregate value; and if $G \leq H$, resetting C to a new value;
    obtaining missing aggregate values from each partial server that did not send particular keys using the new value of C to generate supplemental results; and
    merging the C results and the supplemental results by the logical index server.

5. A method of executing a query in a multiserver computing environment for N sorted results with offset M, the method comprising:
    initiating a query on each of a plurality of partial index servers;
    evaluating results of the query in parallel on each of the plurality of partial index servers;
    sending a predefined number of top partial results from each of the partial index servers to a logical server;
    merging the sent top partial results from the respective partial index servers by the logical server;
    determining whether the predefined number is sufficiently large to return results from one or more of the partial index servers for one or more keys;
    finding deltas for keys missing on one or more of the partial index servers;
    discarding merged aggregate values below the predefined number on the logical server;
    selecting missing aggregate values from the partial index servers having missing keys; and
    merging all obtained results.

* * * * *